US006719908B2

(12) United States Patent  
Hames

(10) Patent No.: US 6,719,908 B2  
(45) Date of Patent: Apr. 13, 2004

(54) PHENOL REMOVAL PRETREATMENT PROCESS

(75) Inventor: Bonnie R. Hames, Westminster, CO (US)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 10/031,208

(22) PCT Filed: Apr. 10, 2001

(86) PCT No.: PCT/US01/11806

§ 371 (c)(1),
(2), (4) Date: May 24, 2002

(87) PCT Pub. No.: WO01/77031

PCT Pub. Date: Oct. 18, 2001

(65) Prior Publication Data

US 2002/0190003 A1 Dec. 19, 2002

Related U.S. Application Data

(60) Provisional application No. 60/195,436, filed on Apr. 10, 2000.

(51) Int. Cl.[7] .................................................. C02F 1/42
(52) U.S. Cl. ...................... 210/660; 210/673; 210/670
(58) Field of Search ............................... 210/670–679, 210/690, 691, 743, 660

(56) References Cited

U.S. PATENT DOCUMENTS

| 3,998,730 A | * 12/1976 | Ploetz et al. | ............... 210/667 |
| 3,998,732 A | * 12/1976 | Solbach et al. | ............ 210/670 |
| 4,276,160 A | * 6/1981 | Donnert et al. | ............ 210/660 |
| 4,595,489 A | 6/1986 | Scouten | |

FOREIGN PATENT DOCUMENTS

| EP | 0 112 723 A 2 | 4/1984 | |
| JP | 59115786 A | * 7/1984 | ......... C02F/01/74 |

* cited by examiner

Primary Examiner—Chester T. Barry  
(74) Attorney, Agent, or Firm—Paul J. White

(57) ABSTRACT

A process for removing phenols from an aqueous solution is provided, which comprises the steps of contacting a mixture comprising the solution and a metal oxide, forming a phenol metal oxide complex, and removing the complex from the mixture.

5 Claims, 1 Drawing Sheet

PHENOL REMOVAL PRETREATMENT PROCESS

The present application claims priority to U.S. provisional application No. 60/195,436 filed Apr. 10, 2000, and to PCT/US01/11806, filed Apr. 10, 2001.

CONTRACTUAL ORIGIN OF THE INVENTION

The United States Government has rights in this invention pursuant to Contract No. DE-AC36-99GO10337 between the United States Department of Energy and the Midwest Research Institute.

TECHNICAL FIELD

The present invention relates to phenol removal and, in particular to a process of removing phenols from an aqueous solution, such as a biomass-hydrolyzate medium.

BACKGROUND ART

The efficiency of methods for the selective removal of biomass-derived-phenolic-compounds, from an aqueous feedstock is a limiting step in any microbial process for the conversion of biomass dissolved sugars into fuels or chemicals. It is also desirable in some applications to remove these aromatic compounds because they contaminate fresh water streams after a forest fire, and process water used in the production or recycling of pulp and paper.

A distinct disadvantage of the prior art methods has heretofore been the inefficiency and low selectivity of the separation process when applied to an aqueous hydrolyzate. One prior method solution involves an extraction of the aqueous hydrolyzate using a series of organic solvents, such as ethyl acetate, TUF or methyl isobutyl ketone. However, in an organic solvent extraction, the water soluble biomass-derived-phenolic compounds remain in the aqueous phase with the dissolved sugars. Another method comprises filtration of the aqueous hydrolyzate through an activated carbon filter. However, with this method, a disadvantage is that the activated carbon removes, in addition to the phenol component, many other organic compounds resulting in an inefficient process.

DISCLOSURE OF THE INVENTION

Therefore, it is an object of the invention to provide a process for removing phenols from an aqueous solution.

It is a further object of the invention to provide a process for the removal of phenols from dissolved sugars in an aqueous biomass-hydrolyzate medium.

It is a yet another object of the invention to provide a biomass pretreatment process for removing lignin-derived phenolic compounds from dissolved sugars in an aqueous biomass hydrolyzate medium, the process of which is capable of regeneration.

The foregoing specific objects and advantages of the invention are illustrative of those, which can be achieved by the present invention and are not intended to be exhaustive or limiting of the possible advantages which can be realized. Thus, those and other objects and advantages of the invention will be apparent from the description herein or can be learned from practicing the invention, both as embodied herein or as modified in view of any variations which may be apparent to those skilled in the art.

To overcome the problems of the prior art methods and in accordance with the purpose of the invention, as embodied and broadly described herein, a process for removing phenols from an aqueous solution is provided which comprises the steps of contacting a mixture comprising the solution and a metal oxide, forming a phenol metal oxide complex, and removing the complex from the mixture.

BRIEF DESCRIPTION OF THE DRAWINGS

The accompanying drawing, which is incorporated in and which constitutes a part of the specification, illustrates at least one embodiment of the invention and, together with the description, explains the principles of the invention.

DESCRIPTION OF THE PREFERRED EMBODIMENTS

Figure 1:
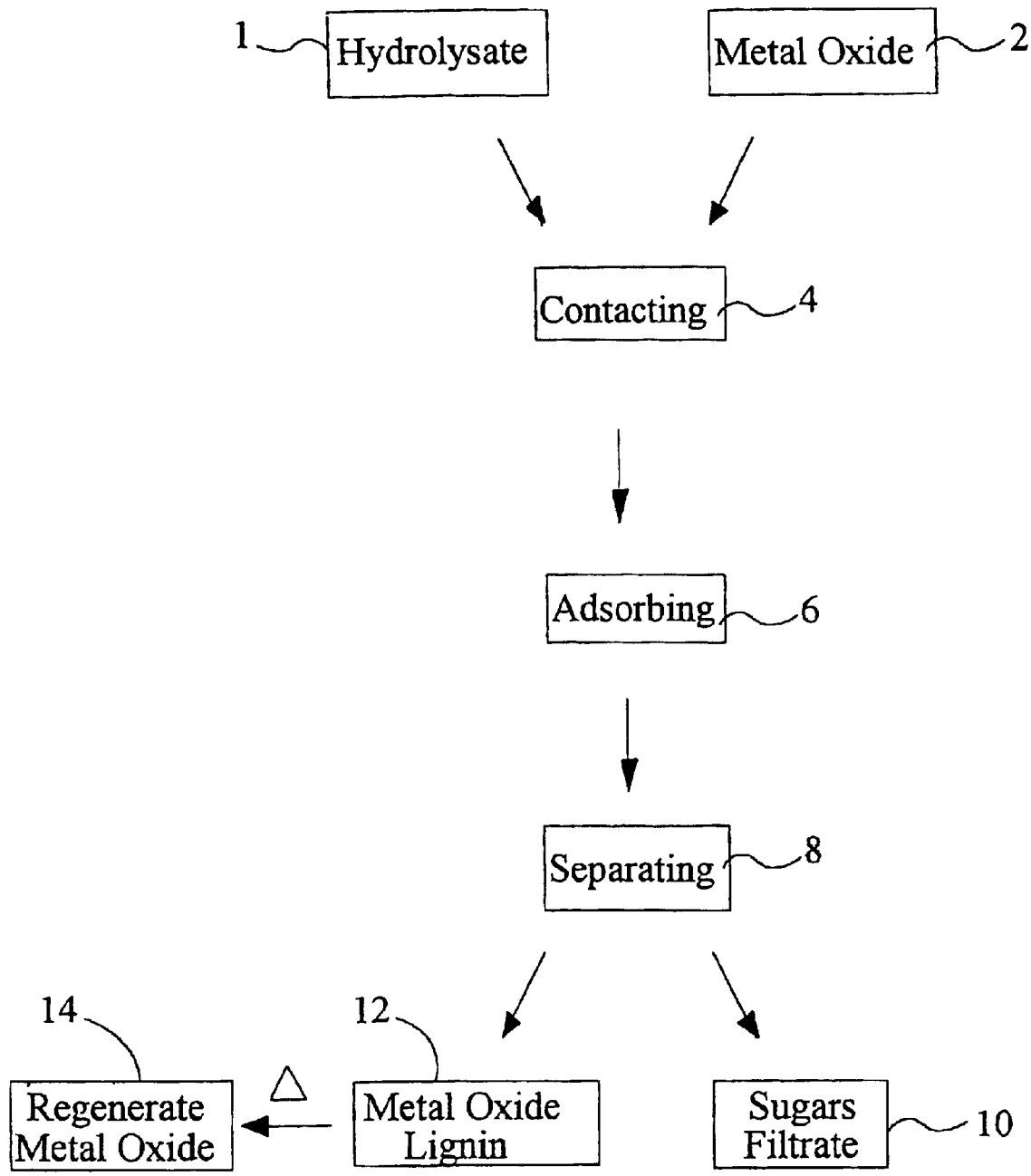
FIG. 1 is a flow chart of an embodiment of the process.

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

As used herein the term "phenolic" is an adjective meaning a member of the class of phenols. "Phenols" means the class of aromatic compounds in which one or more hydroxyl groups are attached directly to a benzene ring. Examples of phenols include phenol, cresol and resorcinol. "Biomass-derived phenols" include the compounds known as guaiacol, syringol, isoeugenol and vanillin.

The process uses a metal oxide, such as titanium dioxide, for the selective adsorption and removal of phenolic compounds from an aqueous solution, such as a biomass-hydrolyzate medium. Dissolved sugars in the solution are thereby concentrated. Adsorption is highly selective, and provides an efficient method for the fractionation of a biomass-hydrolyzate, 90% of the hydrolyzate's dissolved lignin being removed without a measurable decrease in the solution's dissolved sugar concentration. Selectivity is attributable to the metal oxide's preferential binding with those oxygen molecules which are located on adjacent (ortho) carbons of the aromatic ring structures.

With reference now to FIG. 1, the starting material is a biomass hydrolysis liquor 1. The hydrolysis liquor 1 is mixed in contacting step 4, as a suspension, with a metal oxide 2, such as a Norton Chemical Process Products Corporation, Akron, Ohio high-surface-area $TiO_2$ ⅛" extrudate type XT25384. High separation efficiency is generally achieved by using an amount or weight (wt) of $TiO_2$, which is twice the estimated phenol content of the liquor. This ratio varies, however, with the form, source, active surface area, and liquid-contact surface area of the $TiO_2$, to be used. Separation efficiency also varies with the age of the aqueous mixture and source of the biomass. Producing hydrolyzate under conditions of high severity also reduces the separation efficiency.

Selective adsorpting step 6 is accomplished using all grades of $TiO_2$. The rate and efficiency of the adsorption of aromatic compounds with $TiO_2$ is dependent upon the $TiO_2$ active surface area. Anatase titanium dioxide, preferable to the rutile form, may be of any high-surface-area formulation, including powders, thin-films, sol-gel crystals, and extruded pellets. Vanadium oxide and zirconium oxide, and at pH in a range of greater than 7.0 manganese dioxide, silica, and alumina, may also be used.

Depending upon the quantity of the aromatic compounds to be removed, a batch reaction vessel or plug flow reactor may be used as an adsorption vessel. In a batch reactor, the retention time is preferably 30 minutes. In a plug flow column, the retention time is preferably 15 minutes. These retention times typically result in a separation of up to 90-weight % of the aromatics from the hydrolyzate 1. Longer retention times are desirable where the separation is carried out at a low pH. For example, the adsorption is slower in the pH range of 2–6 and occurs more rapidly when the pH is in the range of 7–10.

The process retains its efficiency and selectivity throughout a temperature in the range of 20° C.–90° C. Performing the selective adsorption under conditions of elevated temperature and pH does not affect adsorption selectivity relative to the carbohydrate fraction.

However, above pH 6, some carbohydrate degradation products, such as 5-(hydroxymethyl) furfural and furfural, are also adsorbed on the metal oxide surface. At combinations of higher pH and temperature some entrainment of soluble salts occurs on the metal oxide surface when the hydrolyzate 1 and metal oxide 2 mixture contains salts having a lower solubility at higher temperatures, such as calcium sulfate. Raising both the temperature and the pH does not affect the adsorption selectivity of this process for lignin. After contacting the hydrolyzate and metal oxide, adsorption preferably includes agitating the mixture for a time sufficient to allow the colloidal particles to deposit on the $TiO_2$ particulate surfaces, as indicated by a clearing of the suspension, and allowing the suspension to settle at room temperature for 1 hour. The adsorbed complex is then separated in separation step 8. Separation may by accomplished using a glass-fiber filter. The carbohydrate fraction of the hydrolysis liquor is contained in the sugars filtrate 10.

A unique aspect of the invention is its high separation selectivity for lignin in an aqueous hydrolysis liquor having an excess of monomer sugars. More than 90% of the solubilized lignin can be removed from the hydrolyzate without any loss of glucose or xylose. When using $TiO_2$ extruded pellets as an adsorbent, a slight concentration effect is observed during the adsorption process. This effect may be due to hydration of the metal oxide and the exclusion of sugars from the metal oxide's surface. Solid state nuclear magnetic resonance analysis of lignin model compounds, adsorbed on the $TiO_2$ surface, has suggested that the lignin selectivity is due, at least in part, to an affinity of titanium for adjacent oxygen molecules which are located on the aromatic ring structure of the adsorbed substrates. It has been found that, through chemical shifts in $^{13}C$ nmr between lignin model compounds both before and after complexation with titanium alkoxides, these molecules bind preferentially through the phenolic oxygen and the oxygen of the adjacent methoxyl group. The biomass-derived aromatic substituents have two main substitution patterns, commonly known as guaiacyl and syringyl, which contain the functional groups necessary for the selective fractionation. Although titanium, and many other transition metals, are known to be highly oxyphilic, the affinity of this functionality for these metal oxides is so strong that in the presence of these aromatic compounds, even highly oxygenated carbohydrate-derived compounds are excluded from the metal oxide surface.

The process may also include a regeneration step 14. In this step, the $TiO_2$ adsorbents are easily regenerated using combustion of the complex at 400° C. for 15 minutes. An estimated 100–500 regeneration cycles may be utilized without a significant reduction in adsorption capacity or selectivity. It is preferred to regenerate the $TiO_2$ at a temperature of less than 600° C. in order to avoid an anatase to rutile form conversion, which decreases the metal oxide's capacity for adsorption. A simple regeneration wash step using dilute sulfuric acid may also be used to increase the lifetime of $TiO_2$ adsorbents when the contacting step 4 is carried out at a high pH. When using a pH greater that 7, an additional step of acid washing the adsorbent is desirable. Regeneration of a manganese dioxide adsorbent has also been demonstrated at 575° C. for 15 minutes.

EXAMPLE

This example illustrates the process of removing phenolic compounds from an aqueous biomass hydrolysis liquor using $TiO_2$ as the metal oxide. The hydrolysis liquor was an acid hydrolyzate of hybrid yellow poplar. In this example the following three samples were prepared. Sample No. 1 was prepared by mixing a 50 ml aliquot, of a well mixed hydrolysis liquor containing a larger amount of suspended solids, in contact with 10 grams of Norton high-surface-area $TiO_2$, in a 100 ml beaker. The sample was agitated by hand for approximately 5 minutes. until the mixture became clear (colloidal particulates deposited on the surface of the $TiO_2$). The mixture was allowed to settle at room temperature for 1 hour. The $TiO_2$ mixture was filtered through a glass Watman GFC filter and the filtrate was stored in a glass container. Samples Nos. 2 and 3 were prepared by mixing a 50 ml aliquot, of a well-mixed hydrolysis liquor again containing a large amount of suspended solids, in contact with 10 grams of high surface area $TiO_2$ in a 100 ml beaker. Unlike sample No. 1, the $TiO_2$ in sample No. 2 was left in solution without stirring at room temperature for 8 hours (sample No. 2) prior to the removal of the $TiO_2$ phenolic-adsorption-complex, by gravity filtration. Half of the liquid (20 ml) was decanted and filtered for analysis, and the other half of the solution was retained in contact with the $TiO_2$ overnight (sample No. 3). The beaker was covered with aluminum foil to minimize evaporation. After 20 hours, the remaining liquid of sample No. 3, was decanted from the $TiO_2$ complex and filtered through a Watman GFC glass filter. The filtrates for each sample were diluted in dilute $H_2SO_4$ and analyzed for their phenol concentrations by measuring UV absorbency at 204 nm. In addition, the glucose concentration of the filtrate was measured for each sample using a Yellow Springs Instruments glucose analyzer.

The results of this example are summarized in Table 1. In the table, most of the adsorption occurs within the first hour and very little change is observed in either adsorption or selectivity with prolonged exposure. The absorbance at 204 nm (measured using a ultra-violet/visible spectrometer) reflects the concentration of the phenolic compounds remaining in the treated liquor. The absorbance at 282 nm reflects the concentration of furfural and 5-(hydroxymethyl) furfural. The dilution factor (D) was the dilution used to bring the solution to a concentration where the absorbency is proportional to the concentration.

TABLE 1

| Sample | Absorbance 204 nm | Absorbance 282 nm | D | Lignin mg/ml | Glucose mg/ml |
|---|---|---|---|---|---|
| Original Liquor | 1.0763 | 0.591308 | 641 | 6.3 | 9.4 |
| Sample No. 1 (1 h) | 2.14941 | 0.409973 | 51 | 1 | 10.8 |
| Sample No. 2 (8 h) | 1.48932 | 0.448135 | 51 | 0.7 | 11 |
| Sample No. 3 (16 h) | 1.29463 | 0.5885 | 51 | 0.6 | 10.3 |

While the present invention has been illustrated and described with reference to particular structures and methods, it will be apparent that other changes and modifications can be made therein with the scope of the present invention as defined by the appended claims.

What is claimed is:

1. A process for selective adsorption of biomass derived phenols selected from the group consisting of guaiacol, syringol, isolugenol, vanillin, and lignin from a biomass hydrolysate medium comprising:
   (a) contacting a mixture comprising the biomass hydrolysate medium and a metal oxide;
   (b) forming a phenols compound metal oxide complex;
   (c) removing the phenols metal oxide complex from the mixture; said metal oxide is selected from the group consisting of titanium oxide, vanadium oxide, zirconium oxide manganese dioxide, aluminum oxide and silicon dioxide.

2. The process of claim 1 further comprising adjusting the mixture to a pH greater than 7.0 after contacting.

3. The process of claim 1 wherein after step (a), the mixture is adjusted to a pH in the range of 1.5–11.

4. The process of claim 1 further comprising regenerating the metal oxide after removing the phenols metal oxide complex from the mixture.

5. The process of claim 4 wherein regenerating comprises heating in the presence of oxygen.

* * * * *